(12) United States Patent
Scott (10) Patent No.: US 6,265,699 B1
(45) Date of Patent: Jul. 24, 2001

(54) WATER HEATER WITH ELECTRONIC CONTROL

(75) Inventor: Allen W. Scott, Jonesborough, TN (US)

(73) Assignee: American Water Heater Company, Johnson City, TN (US)

(*) Notice: Subject to any disclaimer, the term of this patent is extended or adjusted under 35 U.S.C. 154(b) by 0 days.

(21) Appl. No.: 09/578,087

(22) Filed: May 24, 2000

(51) Int. Cl.[7] ............................................. H05B 1/02

(52) U.S. Cl. .................... 219/483; 219/486; 219/481; 219/506; 392/454; 374/104

(58) Field of Search ............................ 219/481, 492, 219/497, 494, 501, 487, 506, 505, 483–486; 307/117, 39–41; 392/454; 374/102, 104

(56) References Cited

U.S. PATENT DOCUMENTS

| | | | |
|---|---|---|---|
| 4,901,061 | * | 2/1990 | Twerdochlib ...................... 340/604 |
| 5,449,884 | * | 9/1995 | Lee ..................................... 219/497 |
| 5,723,846 | * | 3/1998 | Koether et al. ................... 219/497 |
| 5,968,393 | * | 10/1999 | Demaline ........................... 219/492 |

* cited by examiner

*Primary Examiner*—Mark Paschall
(74) *Attorney, Agent, or Firm*—Schnader Harrison Segal & Lewis LLP (57) ABSTRACT

A water heater of the invention includes a water container; an element located to heat water in the water container; a sensor located to sense temperature; and a controller, the controller monitors the sensed temperature at termination of a defined time interval and compares the sensed temperature against a predetermined temperature, with the controller further identifying the element as defective when the sensed temperature is less than the predetermined temperature.

24 Claims, 6 Drawing Sheets

WATER HEATER WITH ELECTRONIC CONTROL

FIELD OF THE INVENTION

This invention relates to water heaters, particularly to electric water heaters having an electronic control system.

BACKGROUND

Typical electric water heaters are constructed with one or two electric-powered heating elements to heat water in the water tank, depending on the size and utilization of the water heater. Each element is ordinarily mounted onto a side wall of the tank. Further, in designs incorporating two elements, the elements are typically mounted onto the tank at spaced separation from one another. There are a number of disadvantages associated with such constructions. Element malfunction is not easily detected and is also costly since monitoring devices are required in the overall design. Also, the monitoring devices themselves can malfunction and not detect element failure. In addition, it is often difficult to identify the source of a malfunction, which works to increase the time required for repair and/or replacement of a defective or malfunctioning part.

This invention has been developed in view of the foregoing to overcome the deficiencies of the prior art.

SUMMARY OF THE INVENTION

In accordance with the invention, there is disclosed several embodiments of water heaters as will be described in detail herein. In one aspect, the water heater includes a water container; an element located to heat water in the water container; a sensor located to sense temperature of the element; and a controller connected to the element and the sensor, the controller being capable of identifying element failure or malfunction by monitoring the temperature measured by the sensor.

In another aspect of the invention, there is a water heater that includes a water container; an element located to heat water in the water container; a sensor located to sense temperature of water in the water container; and a controller connected to the element and the sensor, the controller being capable of monitoring temperature information received from the sensor over a predetermined time interval to identify the condition of the element.

In still another aspect of the invention, there is a water heater that includes a water container; a pair of elements located to heat water in the water container; a pair of sensors located to sense temperature of water in the water container; and a controller connected to each of the elements and the sensors, the controller being capable of comparing temperature information received from each of the respective sensors against one another to verify sensor condition.

Other advantages of the various embodiments of the invention will become apparent to those skilled in the art from the drawings, the detailed description of the invention and the appended claims.

DETAILED DESCRIPTION OF THE INVENTION

It will be appreciated that the following description is intended to refer to the specific embodiments of the invention selected for illustration in the drawings and is not intended to define or limit the invention, other than in the appended claims.

Turning now to the drawings in general and FIGS. 1–4B in particular, the number "10" designates an electric water heater of the invention. Water heater 10 includes an outer jacket 12 which surrounds foam insulation 14. Foam insulation 14 surrounds water tank 16. A top pan 18 caps jacket 12 on its upper end and bottom pan 20 caps jacket 12 on its lower end. An inlet 22 in the upper portion of tank 16 provides for cold water to enter the tank through a dip tube 23. Similarly, outlet 24 allows for hot water to exit through the upper portion of tank 16.

Figure 1:
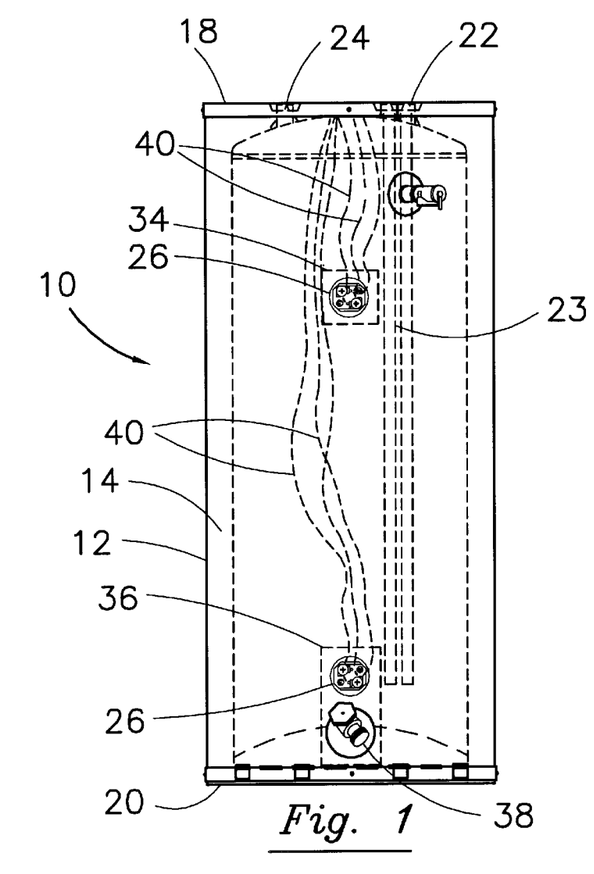
FIG. 1 shows a schematic front elevational view of a water heater in accordance with aspects of the invention wherein dashed lines show interior portions of the water heater.
Figure 2:
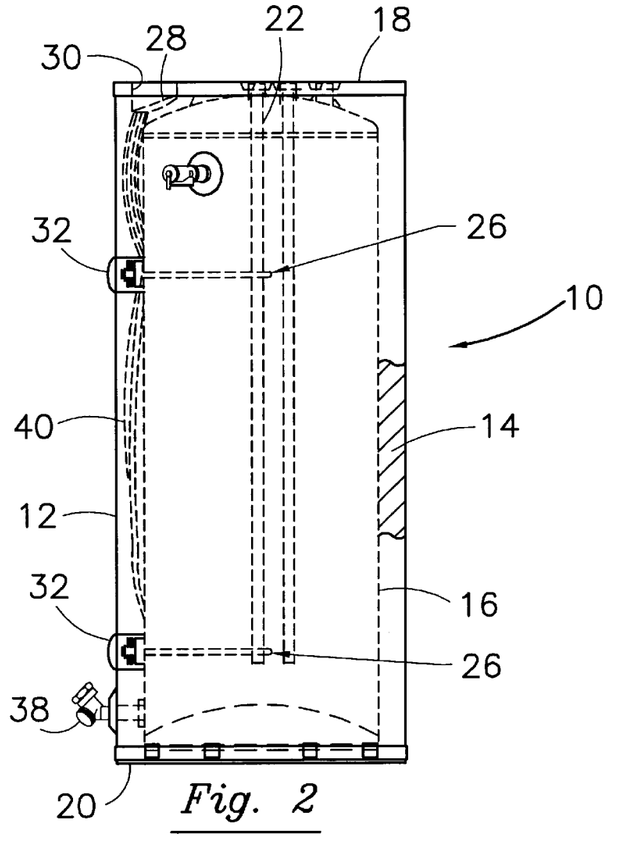
FIG. 2 shows a schematic side elevational view, taken partly in section, of the water heater of FIG. 1.
Figure 3:
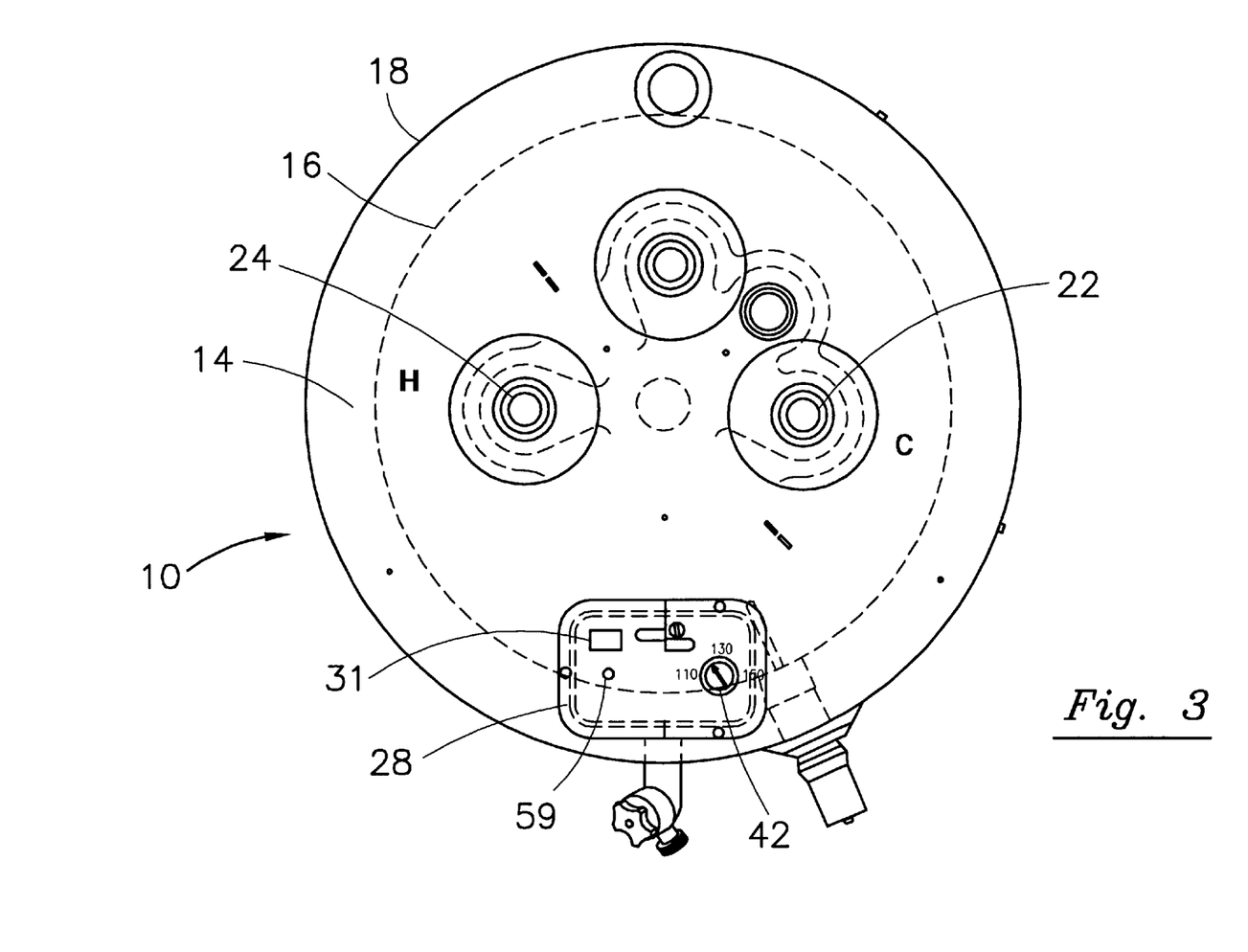
FIG. 3 shows a schematic exploded top view of the water heater shown in FIG. 1 and a user interface.

Water heater 10 also includes one or more heating elements, which can comprise any commercially available heating element. In the present embodiment, a pair of heating elements 26 are mounted to tank 16 and preferably to the side of tank 16 in the present embodiment. Elements 26 are electrically connected to an electronic controller 28 located in this embodiment in a recessed portion 30 of top pan 18. Elements 26 are mounted to the side wall of tank 16 by any of a variety of means well known to those of ordinary skill in the art, such as threads 46, and are preferably covered by plastic caps 32 which snap into position through openings in jacket 12. In the present embodiment, an upper foam dam 34 surrounds upper element 26 and extends between tank 16 and jacket 12. Similarly, lower foam dam 36 surrounds element 26 and spigot 38. Foam dam 36 also extends between jacket 12 and tank 16.

Figure 4A:
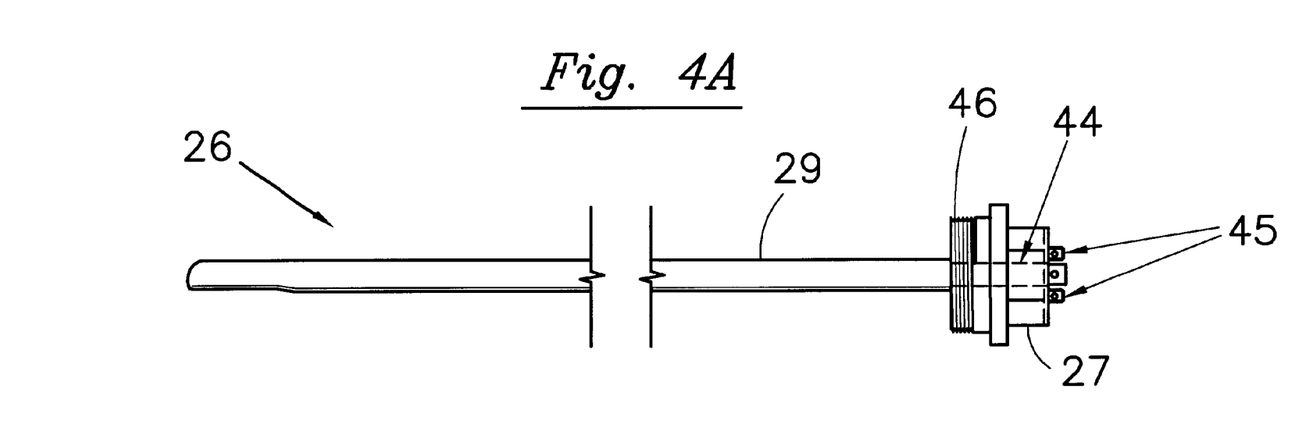
FIGS. 4A and 4B show side and front elevational views, respectively, of a heating element utilized in accordance with aspects of the invention.
Figure 4B:
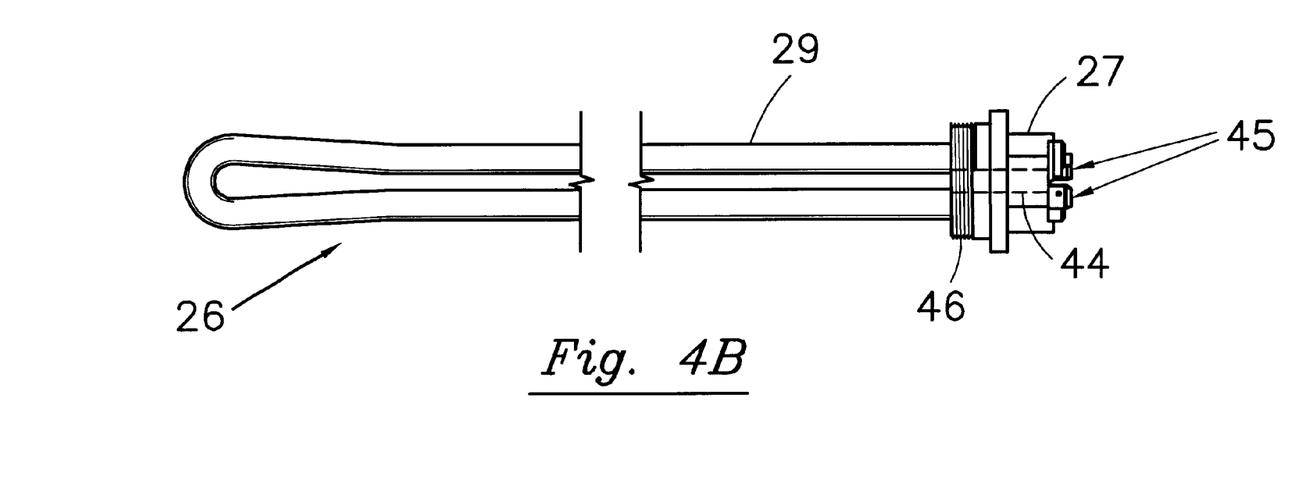

Each heating element 26 in the present embodiment includes a base 27, a resistance heater 29, a thermistor sensor 44 and a pair of thermistor connectors 45. The thermistor 44 is embedded in base 27 between opposing legs of the resistance heater 29. Electronic controller 28 connects to elements 26 by way of wires 40. In other embodiments not shown, the electronic controller 28 can be in wireless communication with elements 26, such as by RF, infrared or other suitable medium. Wires 40 extend between electronic controller 28 and elements 26 through the space between jacket 12 and tank 16. That space is otherwise filled with insulation 14. It is possible for wires 40 to be located such that foam-forming liquids form directly around wires 40 during the foaming process. Also, wires 40 can be located within a passageway created within the foam, if desired, such as with tubes, pipes and the like. Electronic controller 28 is a user interface and in the present embodiment includes a water temperature adjustment dial 42 which can be rotated to select a variety of water temperatures at which the water within tank 16 will be maintained.

Figure 5:
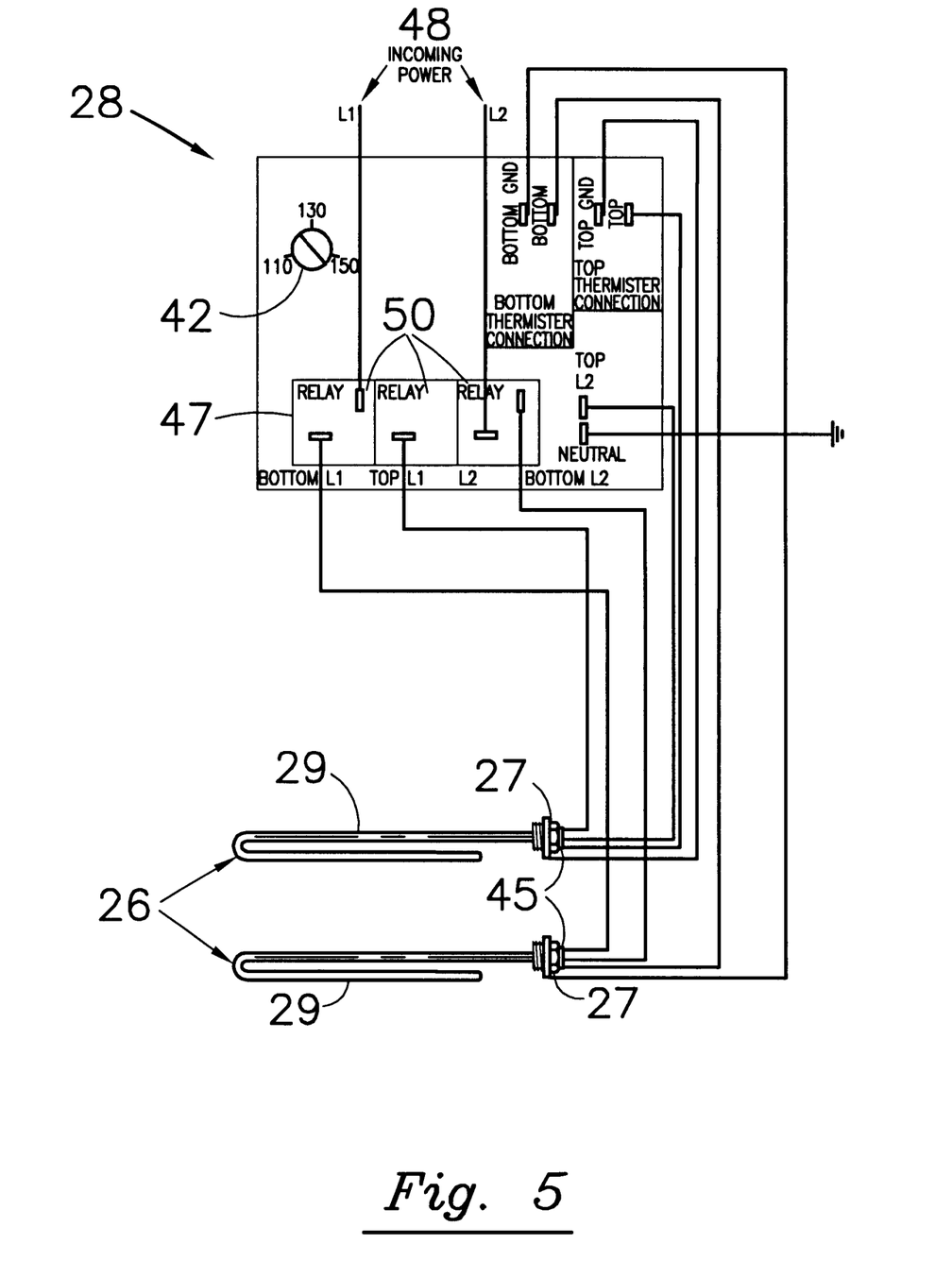
FIG. 5 discloses a circuit diagram of the control system of a water heater in accordance with aspects of the invention.
Figure 6:
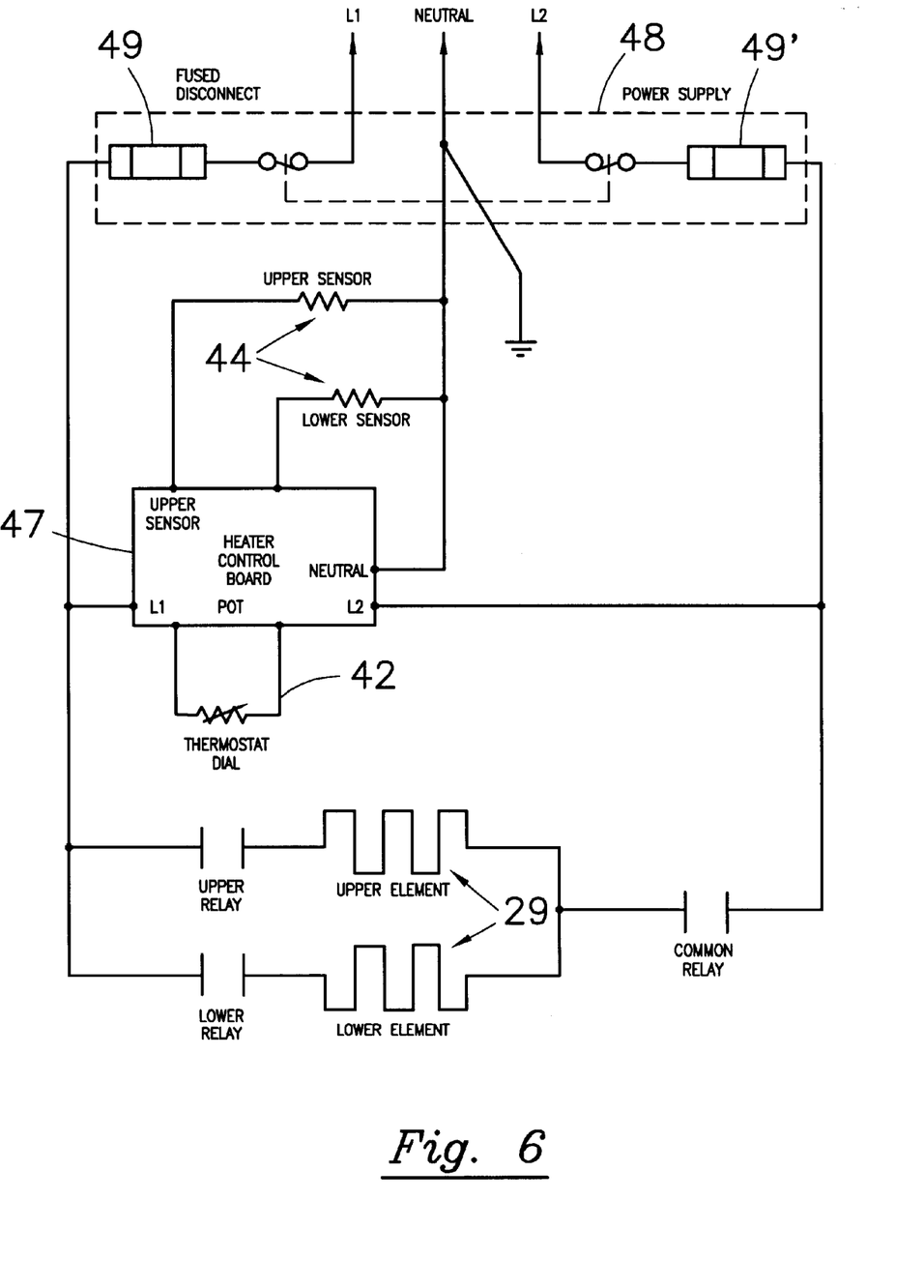
FIG. 6 shows a ladder diagram of the control system of a water heater in accordance with aspects of the invention.

The specifics of the connections and operations of one embodiment of the electronic controller 28 and heating elements 26 are shown in FIGS. 5 and 6. Thermistor 44 is connected in a conventional manner through thermistor connectors 45 to electronic controller 28. Resistance heater 29 is also connected to heater control board 47 via relays 50 on heater control board 47. Electrical power is supplied to the system through power supply 48, which include fuses 49 and 49' for de-energizing the system in the event of an amperage surge.

Heater control board 47 preferably incorporates electronic control circuitry for controlling operation of the water heater, as described in more detail below. Such control circuitry may incorporate a number of electronic components, known to those of ordinary skill in the art, such as solid state transistors and accompanying biasing components, or one or more equivalent, programmable logic chips. The electronic control circuitry may also incorporate a programmable read only memory (PROM), random access memory (RAM) and a microprocessor. The arrangement and/or programming of these components may take any number of forms well known to those of ordinary skill in the art to accomplish operation of the water heater as described below.

Turning now to operational aspects of the embodiment described above, when there is a call for hot water, hot water exits through outlet 24 and cold water is introduced through inlet 22. Thermistor sensors 44 detect the temperature of water within tank 16 at positions interior of the water tank side wall. Thermistors 44 then send temperature information, typically in the form of an electrical signal, to controller 28.

Controller 28 in one embodiment is programmed with predetermined differential temperatures to determine the temperature at which controller 28 energizes element 26. The predetermined differential can be made to be variable if desired. When the temperature of the water within tank 16 decreases to that predetermined differential, controller 28 detects such temperature information received from thermistor 44 and energizes element 26. Element 26 continues in the energized state to heat the water until temperature information received from thermistor 44 indicates that the water temperature has reached a predetermined set point.

The predetermined set point can be selected by adjustment dial 42 and is variable. When controller 28 detects that the predetermined set point has been reached, controller 28 de-energize element 26. The predetermined set point typically has variable settings for de-energizing elements 26. Such selectable settings are preferably about 90° F.–180° F. The differential for energizing the elements can vary depending on the task to be performed.

In accordance with another embodiment of the invention, the controller 28 is programmed to utilize the lower thermistor 44 to verify operation of the upper thermistor 44. The upper thermistor 44 is used to preferably both detect over temperature conditions as well as control the function of the upper element 26. For this reason, safety considerations of the system require that correct readings are made by the upper thermistor 44.

In this embodiment, the controller 28 monitors the temperatures detected by the upper thermistor 44 and the lower thermistor 44 at predetermined times and intervals to verify operation. Preferably, the programming of the controller 28 prompts either a status indicator and/or regulates operation of the water heater depending on a comparison of the differences between the temperatures detected by the upper and lower thermistors 44 with a preset value stored in the controller 28. For example, in one especially preferred embodiment, the controller 28 is programmed to compare the temperatures of the upper and lower thermistors 44 each time the lower element 26 is turned off.

In this illustrated embodiment, the temperatures measured by the upper and lower thermistors 44 at the time just after the lower element 26 is switched off should be about the same. The reason is that the electric water heater 10 will not "stack". Stacking is a temperature gradient from bottom to top of the tank. For example, upon heating of the water in the tank 16 in operation, the upper element 26 will reheat water at the top of the tank very fast and the lower element 26 will heat the water in the lower portion of the tank much more slowly. As the water in the lower portion of the tank 16 approaches the set point, convection currents from the elements 26 start to mix the hot water at the top of the tank 16 with the warm water in the lower portion of the tank 16. Eventually, preferably the convection currents circulate the water in the entire tank 16, so that the water throughout tank 16 is of a substantially uniform temperature, and more preferably, at a uniform temperature when the lower element 26 is shut off.

The controller 28 is preferably programmed to shut down and more preferably to also send an error indicator where in two consecutive reads there is detected, for example, a ten degree Fahrenheit or greater difference between the upper and lower thermistors 44 at the point when the lower element 26 is shut off. As should be understood, the controller 28 can be programmed to shut down the system and/or send an error indication at any desired temperature difference between the upper and lower thermistors and after any desired amount of repeatability. In this manner, both failure of the upper thermistor 44 as well as malfunction or other improper operating condition can be detected. For example, thermistors normally fail open or shorted and they rarely fail in a manner that will cause the resistance to increase but not go open. In some instances, it is possible that the thermistor is not making good contact with the tank or is exposed to a low ambient temperature which causes the thermistor to give an incorrect reading.

In accordance with the present embodiment, preferably an additional feature of the water heater 10 is that failure of either one or both of the upper and lower elements 26 can also be detected, although as should be understood, each of these features are not required to be provided together in a single embodiment. For this purpose, the controller 28 is programmed to monitor changes in water temperature over time adjacent and preferably just above an element being energized. In the present embodiment, the controller 28 monitors both the upper and lower thermistors 44 above the respective upper and lower elements 26. The controller 28 is programmed to monitor, over a defined time period following energizing of the corresponding elements 26, the changes in temperature detected by each of the thermistors 44 against a predetermined temperature.

The defined time period is preferably set at one hour and the predetermined temperature is set at two degrees, although as should be understood, the controller 28 can be programmed having a defined time period of any desired duration and a predetermined temperature of any desired level. For example, any longer or shorter time duration or any higher or lower temperature is possible. Further, the controller 28 is preferably programmed to identify when the change in temperature detected by either the upper or lower thermistor 44 does not increase to at least reach the predetermined temperature by the end of the defined time period, which signifies that a respective element is defective.

In this embodiment, the controller 28 identifies when the change in temperature sensed by a thermistor 44 does not reach two degrees in the one hour following energizing of the corresponding element 26. In addition, the controller 28 can also be programmed to take further steps when a defective element is identified. In an especially preferred embodiment, the controller 28 is programmed to both send an error indication when a defective element is identified and continue operation of the water heater 10.

The following will explain in detail the operation of controller 28 in accordance with the present embodiment following the detection of failure of either one of the upper and lower elements 26. Upon failure of the lower element 26, the controller 28 continues to operate the water heater 10 in the same manner as before the failure detection. In this manner, the water temperature in the top of tank 16 remains hot due to heating by the upper element 26. After a prolonged period of operation, there will be a reduction in the amount of hot water available from the water heater 10. In this embodiment, the controller 28 is programmed to send an error indication on failure of either one of the elements 26, which will be described in detail below. Accordingly, in operation following failure of the lower element 26, the user will notice a reduced amount of hot water available, which will alert the user of a potential problem even if the error indication was not received or noticed by the user.

Upon failure of the upper element 26, the controller 28 operates to give the lower element 26 priority, which effectively turns off the upper element 26 and heats the water in tank 16 with only the lower element 26. The water heater 10 will again continue to operate in this manner until the user receives and/or notices an error indication or the user notices a reduction in the amount of available hot water.

As indicated above, the water heater 10 in accordance with this embodiment is preferably adapted so that the controller 28 will send an error indication upon detection of sensor and element failure or malfunction. In accordance with this feature, any conventionally known visual and/or audible alarm can be used for this purpose. In an presently preferred embodiment, the water heater 10 includes a visual display associated with the controller 28. As shown in FIG. 3, the visual display 59 preferably is an LED display and is mounted on the heater control board 47, although other types of displays can also be provided and mounted at other locations on water heater 10.

In operation, one or a plurality of conventionally known LED devices can be utilized for this purpose, which are visible outside the junction box housing the controller 28. In this embodiment, a single LED is provided and operates in the following manner. The LED emits a steady glow when there are no detected system problems. An error signal from the controller 28 on detection of a system problem causes the LED to emit a flashing light. In addition, preferably the controller 28 is programmed so that the error signal will cause the LED to emit a specific flash sequence depending on the nature of the system problem, for example, "dry fire", thermistors open or shorted, failed elements and thermistors that are out of calibration or giving incorrect readings. As should be understood, the feature of a display is optional and may be eliminated where desired.

The water heater 10 can also include one or more of any various conventionally known dip tubes, which are generally designed to regulate mixing of hot and cold water inside of the tank. The mixing of the hot and cold water is partially the result of currents generated by the inward flow of cold water, by the outward flow of hot water, and by the convection currents established within the tank. One or more dip tubes 23 can be incorporated in the water heater 10 and designed to terminate at various locations to control the intake of cold water, to control the withdrawal of hot water and/or to minimize convection currents.

In accordance with another embodiment of the present invention, the controller 28 can also be programmed to detect a defective dip tube, such as instances where a dip tube has broken off, is damaged or has fallen into the tank 16, as examples. The controller 28 preferably monitors the water temperatures at the upper and lower thermistors 44 to detect any abnormal temperature profiles; for example, a temperature inversion or a situation where the temperatures at the top and bottom portions of tank 16 cool together or at substantially the same rate. A temperature inversion where the top of tank 16 becomes cold before the bottom will only exist when the dip tube is defective. In a normal operating mode, the bottom portion of tank 16 will cool before the top portion cools. The monitoring can occur at any time, such as when upper element 26 is energized (turned on) as an example. In one embodiment, the controller 28 sends an error signal following detection of dip tube failure but still allows continued operation of the water heater 10.

The water heater 10 can also include additional features as well where desired. For example, in another embodiment, the controller 28 can also contain a lock-out set point which is preferably less than about 210° F. The control lock-out prevents elements 26 from energizing when the water temperature reaches an abnormal predetermined set point and the controller 28 will not permit energizing of elements 26 until controller 28 is reset by removing power and then subsequently reapplying power. This can be accomplished automatically by controller 28, thereby reducing and possibly eliminating the need for a mechanical reset control. Such a reset could be performed by a reset user interface 31 on controller 28. The sensing capabilities of sensors 44 are such that elements 26 can be energized and de-energize after only approximately 1.5 gallons of water have been drawn from tank 16. This compares to about 3.0 gallons of water removal in prior art constructions.

The following illustrates one particular sequence of operational steps to achieve operation of the water heater. When the water heater control system is first started, the control electronic circuitry of heater control board 47 records the initial temperature at bottom element 26 and then turns on the bottom element 26 for ten seconds and then off for two minutes. Heater control board 47 then records the final temperature of the bottom element 26 as measured through thermistor 44 and calculates the difference between the final temperature and initial temperature.

If the difference between these temperatures is greater than five degrees, then heater control board 47 turns off both elements 26 through relays 50. Heater control board 47 then checks to see if system power has been turned off or reset through incoming power supply 48. Once the system has been reset, heater control board 47 then begins this process from start. If, however, the temperature differential is less than five degrees, then heater control board 47 energizes bottom element 26 to heat the water in tank 16 until it reaches the temperature set on temperature adjust dial 42.

If the temperature of temperature adjust dial 42 is less than 110° F., then the top element 26 remains off. Otherwise, heater control board 47 checks the temperature at thermistor 44 in upper element 26. If the temperature of thermistor 44 in upper element 26 is equal to the temperature of dial 42 minus 5° F., then heater control board 47 does not energize upper element 26 until the temperature at thermistor 44 in upper element 26 is less than the turn on temperature (which is typically the temperature set on temperature adjust dial 42 minus some increment such as 5°) minus 5° F. Heater control board 47 then energizes top element 26.

Heating water in tank 16 then continues in a conventional manner until the turn off temperature of temperature adjust dial 42 is achieved.

By energizing upper and lower elements 26 in the manner described above, there are significant advantages. For example, energizing the element briefly (e.g., about 5–10 seconds) and detecting temperature with a thermistor allows heater control board 47 to prevent elements 26 from being energized for long periods of time in a "dry fire" condition, thereby avoiding substantial degradation of the elements and significantly extending their life. Thus, the terms "substantially no degradation" refers to little or no element degradation that occurs for an element energization period of about 5 seconds and up to about 10 seconds. Energizing the element for longer than about 10 seconds can result in substantial degradation under dry fire conditions. In this manner, if the detected temperature rises quickly over a short time interval, then there is little or no water in tank 16. Alternatively, if there is little or no change in the detected temperature over a short time interval, then there is sufficient water in tank 16.

Use of thermistor 44 also allows for a much more accurate and responsive detection of temperature than the use of more conventional temperature-sensing technology, such as bimetallic strip, although other such conventional temperature-sensing technology can be used where desired. This allows the significant temperature changes which occur in a short period of time under a dry fire condition to be detected with only a short (e.g., about 5–10 seconds) energizing of the heating element 26. In this way, a dry fire condition can be detected virtually immediately to prevent overheating of the element, which significantly reduces its useful life.

Also, use of thermistors 44 eliminates the electromechanical thermostats and their associated foaming aprons, fiberglass batts and the like. Small doughnut-shaped foam dams surround the bases 27 and permit foam insulation to cover more surface area of the tank.

The following illustrates an alternative set of operational steps in accordance with this embodiment. In this embodiment of the invention, during control power up of the water heater, heater control board 47 checks to see if there is a need for heating of the water at lower element 26 by measuring the temperature at thermistor 44 and comparing the measured temperature with that of temperature adjust dial 42. If such a demand exists, heater control board 47 energizes lower element 26 and continuously checks to see if the water heating demand is satisfied. Once this heating demand is satisfied, heater control board 47 then repeats this process for the upper element 26.

Figures 7, 8, 9, 10, 11:
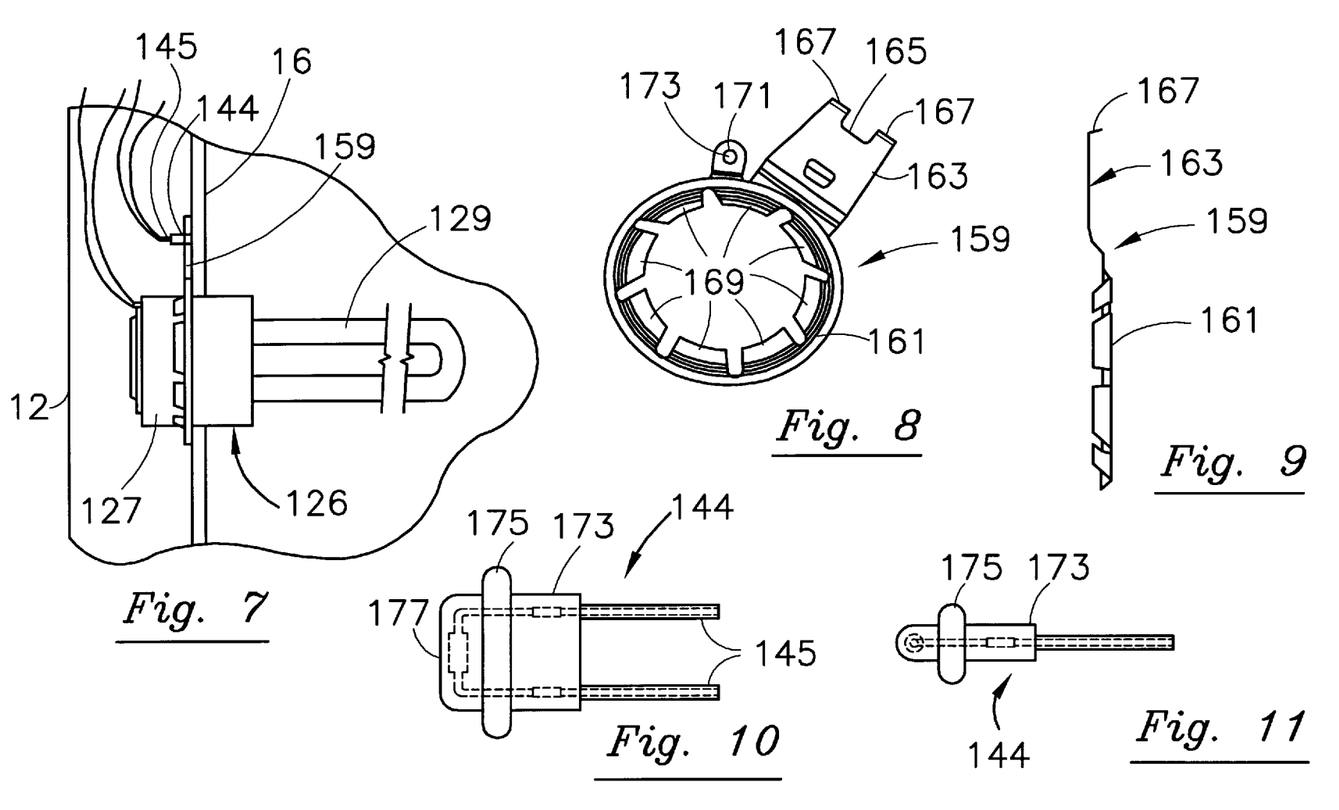
FIG. 7 shows a schematic side elevational view, taken partly in section, of another embodiment of a heating element in accordance with the water heater of FIG. 1.
FIG. 8 is an isolated perspective view of mounting bracket in accordance with the heating element of FIG. 7.
FIG. 9 is a side elevational view of the mounting bracket of FIG. 8.
FIG. 10 is an isolated top plan view of a sensor in accordance with the heating element of FIG. 7.
FIG. 11 is a side elevational view of the sensor of FIG. 10.

Another embodiment of the invention is illustrated in FIG. 7. The heating element 126 illustrated in FIG. 7 is shown in a mounted position within the water tank 16 and surrounded by the jacket 12, similar to the heating element 26 described above. For ease of this illustration, the portions of the heating element 126 which correspond to portions of the heating element 26 will be identified using the same number designations except beginning with the number 100.

In this embodiment, each of the heating elements 126 comprises a base 127, a resistance heater 129, a sensor preferably comprising a thermistor sensor 144 and a pair of thermistor connectors 145, and with the heating elements 126 each being connected to the electronic controller 28 (see FIG. 3). The thermistor sensor 144 is spaced from the base 127 and positioned adjacent and preferably engaging an outer surface of the water tank 16. In this embodiment, the positioning of the thermistor 144 is accomplished through use of a bracket 159. As illustrated in FIGS. 8 and 9, the mounting bracket 159 includes an annular mounting ring 161 which is received onto the base 127 and an extension arm 163 attached to the perimeter of the annular ring 161. The extension arm 163 is generally rectangular in configuration and includes a notch 165 at a distal end which is generally rectangular in this embodiment. The extension arm 163 also includes at least one, and in this embodiment, two flanges 167 at the distal end, and with each flange 167 positioned on opposite sides of notch 165. The mounting bracket 159 also includes a plurality of flexible tabs 169 attached with an inner surface of annular ring 161 and extending in a generally inwardly direction. The mounting bracket 159 further includes a tab 171 extending outwardly from the perimeter of annular ring 161 and includes opening 173 extending there through. The mounting bracket 159 can be made from any suitable material and manufacturing process, such as manufactured from stamped metal.

The thermistor 144 in this embodiment is illustrated in FIGS. 10 and 11. The thermistor 144 is encapsulated preferably in glass and defines a generally rectangular body 173 and a collar 175 proximate an end 177 which is distal the connectors 145.

Assembly of the mounting bracket 159 and thermistor 144 will now be described. The thermistor 144 is positioned in notch 165 in the mounting bracket 159. The mounting bracket 159 is secured by the annular ring 161 on the base 127. The mounting bracket 159 is positioned adjacent the water tank 16 in the secured position. The thermistor 144 is located so that end 177 is positioned adjacent and preferably engaging the outer surface of the water tank 16. The position of the thermistor 144 is facilitated by the flanges 167, which preferably engage the outer surface of the water tank 16 in order to stabilize the mounting bracket 159.

The function of the heating element 126 in this embodiment during operation of the water heater 10 will now be described. Contrary to the heating element 26, the thermistor 144 in this embodiment operates by monitoring the temperature of the side wall of water tank 16. The temperature of the side wall of water tank 16 is effected by the temperature of water within the tank 16 as well as the temperature of heating elements 129. For example, when water is present in the tank 16 in the area of the sensor 144, the temperature of the tank 16 will substantially correspond and preferably will be substantially identical to the temperature of the water. In dry fire conditions, the temperature of the tank 15 will be elevated due to the heat from the heating elements 129. In this manner, the thermistor 144 will operate in the same manner as thermistor 44, except the thermistor 144 will not be positioned inside of the tank or come into direct contact with the water in the water heater 10.

Although this invention has been described in connection with specific forms thereof, it will be appreciated that a wide variety of equivalents may be substituted for the specific elements described herein without departing from the spirit of the scope of this invention as described in the appended claims. For example, water tank 16 may be made of a number of sizes and shapes and may be made from a wide variety of materials such as metals and/or plastics. Foam insulation 14 may similarly be made from any number of high energy efficient foam insulations well known in the art.

The bottom of the water tank 16 may have various shapes, either with lower flanges as shown or as a flat construction. Other modifications may be made, including use of foam insulation between the bottom of tank 16 and bottom pan 20. Also, outer jacket 12 may be made from any number of materials such as rolled metals, preferably steel, or extruded vinyl materials and the like. Also, top pan 18 and bottom pan 20 may be deep-drawn, stamped or the like, or be made from metal, plastic or other suitable materials. Various types of heating elements may be utilized so long as they are used in conjunction with thermistor sensors 44.

What is claimed is:

1. An electric water heater comprising:
    a water container;
    a first element located to heat water in said water container;
    at least one first element sensor located to sense temperature proximate to said first element;
    a controller connected to said first element and said at least one first element sensor, said controller monitoring said sensed temperature of said first sensor at termination of a defined time interval and comparing said sensed temperature against a predetermined temperature, said controller further identifying said first element as defective when said sensed temperature is less than said predetermined temperature;
    a second element located above said first element and positioned to heat said water; and
    at least one second element sensor located to sense temperature proximate to said second element, said second element and said second sensor being connected to said controller, said controller monitoring said sensed temperature of said second sensor at termination of a defined time interval following energizing of said second element and comparing said sensed temperature of said second sensor against said predetermined temperature, said controller further identifying said second element as defective when said sensed temperature of said second sensor is less than said predetermined temperature.

2. The water heater defined in claim 1 wherein said sensor is a thermistor and said element comprises a base and a resistance heater.

3. The water heater defined in claim 1 wherein said defined time interval is initiated by energizing of said at least one element.

4. The water heater defined in claim 3 further comprising:
    a second element located above said at least one element and positioned to heat said water; and
    a second sensor located to sense temperature, said second element and said second sensor being connected to said controller, said controller monitoring said sensed temperature of said second sensor at termination of a defined time interval following energizing of said second element and comparing said sensed temperature of said second sensor against said predetermined temperature, said controller further identifying said second element as defective when said sensed temperature of said second sensor is less than said predetermined temperature.

5. The water heater defined in claim 4 wherein the controller continues operation of said water heater upon detection of failure of said at least one element.

6. The water heater defined in claim 5 wherein said controller gives priority to said at least one element and continues operation of said water heater upon detection of failure of said second element.

7. The water heater defined in claim 6 further including a display and said controller provides an error indication to said display upon detection of failure of either said at least one element or said second element.

8. An electric water heater comprising:
    a water container;
    a first element located to heat water in said water container;
    a first sensor located to sense temperature of water in said water container proximate to said first element;
    a second element located to heat water is said water container;
    a second sensor located to sense temperature of water in said water container proximate to said second element; and
    a controller, said controller comparing said sensed temperature of said first sensor with said sensed temperature of said second sensor at a predetermined time to identify a temperature difference, wherein said temperature difference is compared with a preset value and said controller identifies a problem of said second sensor when said temperature difference is equal to or greater than said preset value after a desired amount of repeatability.

9. The water heater defined in claim 8 wherein said controller shuts down operation of said water heater upon detection of a problem of said second sensor.

10. The water heater defined in claim 8 wherein said first and second sensors are thermistors and said first and second elements comprise a base and a resistance heater.

11. The water heater defined in claim 8 wherein said controller operates said first element depending on said sensed temperatures of at least one of said first and second sensors, wherein said predetermined time corresponds to when said first element is turned off.

12. The water heater defined in claim 9 further including a display and said controller provides an error indication to said display upon detection of a problem of said second sensor.

13. An electric water heater comprising:
    a water container;
    a first element located to heat water in said water container;
    a first sensor located to sense water temperature proximate to said first element;
    a second element located to heat water is said water container;
    a second sensor located to sense water temperature proximate to said second element;
    at least one dip tube; and
    a controller, said controller comparing said sensed temperature of said first sensor with said sensed temperature of said second sensor at a predetermined time to identify a temperature profile, wherein said controller identifies a problem of said at least one dip tube upon detection of an abnormal temperature profile.

14. The water heater defined in claim 13 wherein said controller operates said second element depending on said sensed temperatures of at least one of said first and second sensors, wherein said predetermined time corresponds to when said second element is energized to turn on.

15. The water heater defined in claim 14 further including a display and said controller provides an error indication to said display upon detection of a temperature inversion and continues operation of said water heater.

16. An electric water heater comprising:

a water container;

at first element located to heat water in said water container;

a first sensor located to sense water temperature proximate to said first element;

a second element located to heat water is said water container;

a second sensor located to sense water temperature proximate to said second element; and a controller, said controller monitoring said sensed temperature of said first and second sensors at termination of a defined time interval and comparing said sensed temperatures against a predetermined temperature, said controller further identifying a problem of either said first element or said second element as defective when said sensed temperatures is less than said predetermined temperature, said controller further comparing said sensed temperature of said first sensor with said sensed temperature of said second sensor at a predetermined time to identify a temperature difference, wherein said temperature difference is compared with a preset value and said controller identifies a problem of said second sensor when said temperature difference is equal to or greater than said preset value after a desired amount of repeatability.

17. An electric water heater defined in claim 16 further comprising at least one dip tube; and said controller compares said sensed temperature of said first sensor with said sensed temperature of said second sensor at a second predetermined time to identify a temperature profile, wherein said controller identifies a problem of said at least one dip tube upon detection of an abnormal temperature profile.

18. The water heater defined 17 further including a display, wherein said display comprises at least one LED, wherein said at least one LED emits a specific flash sequence depending on a type of problem identified by said controller.

19. The water heater defined in claim 18 wherein said defined time interval is initiated by energizing of said at least one element, wherein said controller operates said first and second element depending on said sensed temperatures of said first and second sensors, wherein said predetermined time corresponds to when said first and second elements are energized to turn on.

20. The water heater defined in claim 19 wherein the controller continues operation of said water heater upon detection of failure of said at least one element, wherein said controller gives priority to said at least one element and continues operation of said water heater upon detection of failure of said second element, wherein said controller shuts down operation of said water heater upon detection of a problem of said second sensor and said controller provides an error indication to said display upon detection of an abnormal temperature profile and continues operation of said water heater and said controller provides an error indication to said display upon detection of failure of either said at least one element or said second element.

21. The water heater defined in claim 20 wherein said sensor is a thermistor and said element comprises a base and a resistance heater.

22. An electric water heater comprising:

a water tank;

at least one heating element located to heat water in said water tank;

at least one sensor located adjacent an outer surface of said water tank to sense temperature of said water tank;

a controller operatively connective to the at least one heating element and the at least one sensor for operating said at least one heating element based on the sensed temperature received from said at least one sensor.

23. The water heater defined in claim 22, wherein said heating element further comprises:

a base member extending through a wall of the water tank; and a bracket attached to the base and mounting said at least one sensor.

24. The water heater defined in claim 23, wherein the sensor comprises a thermistor and said bracket includes an extension arm for positioning a portion of the thermistor in contact with the outer surface of the water tank.

* * * * *